(12) United States Patent
Chen et al.

(10) Patent No.: US 7,994,767 B2
(45) Date of Patent: Aug. 9, 2011

(54) CONTROL DEVICE FOR TRANSIENT RECOVERY OF DC-DC CONVERTERS

(75) Inventors: Yi-jan Emery Chen, Taipei (TW); Pang-Jung Liu, Taipei (TW)

(73) Assignee: National Taiwan University, Taipei (TW)

( * ) Notice: Subject to any disclaimer, the term of this patent is extended or adjusted under 35 U.S.C. 154(b) by 371 days.

(21) Appl. No.: 12/337,975

(22) Filed: Dec. 18, 2008

(65) Prior Publication Data

US 2009/0322294 A1 Dec. 31, 2009

(30) Foreign Application Priority Data

Jun. 25, 2008 (TW) ................................ 97123648 A

(51) Int. Cl.
*G05F 1/46* (2006.01)

(52) U.S. Cl. ....................................................... 323/282
(58) Field of Classification Search .......... 323/222–226, 323/268, 271, 282, 284, 285; 363/39, 50
See application file for complete search history.

(56) References Cited

U.S. PATENT DOCUMENTS

| | | | | |
|---|---|---|---|---|
| 6,362,607 B1 * | 3/2002 | Wickersham et al. | ........ | 323/272 |
| 6,621,256 B2 * | 9/2003 | Muratov et al. | ............... | 323/282 |
| 7,292,017 B2 * | 11/2007 | Wang | ............................ | 323/282 |
| 7,683,590 B2 * | 3/2010 | Yoshida | ........................ | 323/224 |

* cited by examiner

*Primary Examiner* — Adolf Berhane
*Assistant Examiner* — Yemane Mehari
(74) *Attorney, Agent, or Firm* — Peter F. Corless; Steven M. Jensen; Edwards Angell Palmer & Dodge LLP

(57) ABSTRACT

A control device for fast transient recovery of the output voltage of DC-DC converters. The control device is characterized by using a dual-threshold method to compare the actually received loading voltage values on the loading terminals of DC-DC converters, i.e., a total of four threshold levels including a negative-ripple falling-edge threshold and a negative-ripple rising-edge threshold on the negative polarity, and a positive-ripple rising-edge threshold and a positive-ripple falling-edge threshold on the positive polarity. During the transient, the load current charging/discharging control device disclosed in the invention may be switched between charging and discharging mode based on the relation between two-pairs threshold values and output voltage amplitude of DC-DC converters. This mechanism may allow DC-DC converters with higher slew rate to make transient ripples on output voltage to return to steady state more quickly.

20 Claims, 5 Drawing Sheets

CONTROL DEVICE FOR TRANSIENT RECOVERY OF DC-DC CONVERTERS

BACKGROUND OF THE INVENTION

1. Field of the Invention

This invention relates to electronic circuit technology, and more particularly, to a control device for fast transient recovery of the output of a DC (direct current) power output device, such as DC-DC converters.

2. Description of Related Art

DC-DC converters are an electronic circuit component that is nowadays widely used in many types of computers and intelligent electronic devices for providing DC power. In operation, a DC-DC converter is capable of converting an input DC voltage having a higher amplitude (such as battery-supplied voltage) to an output DC voltage having a lower amplitude, such that the down-converted DC voltage is used to drive low-voltage IC (integrated circuit) chips, such as microprocessors, memory modules, digital signal processing chips, to name just a few. Nowadays, the present IC technology allows IC chips to operate with a system voltage as low as 0.8 V with a current of 200 A.

In practical applications, however, the operation of modern IC chips may provide serious load current variation in range of 20 A to 200 A due to the complexity thereof. Such serious load current variation may cause much serious output voltage transient response, such as over-shoot and under-shoot, to make the output voltage substantially deviating from the steady state value, which the output voltage should achieve. The output voltage may be provided with larger difference between the steady state value and the transient response by this deviation, thereby slowing down the transient response recovery. One solution to this problem is to employ large decoupling capacitors for reducing transient ripples, and the smaller transient ripples allow the output voltage of DC-DC converters to return to steady state more quickly. In practice, however, the solution with the large capacitors has two drawbacks: firstly, it is costly in price to purchase and thus would increase the overall manufacture cost of DC-DC converters; and secondly, due to the bulky size of the large capacitors, it would require a large circuit layout area for implementation of the DC-DC converters.

In view of the aforementioned problem, there exists a need and a research effort in the electronic industry for a new circuit technology that may allow the fast transient recovery of the output voltage of DC-DC converters.

SUMMARY OF THE INVENTION

This invention provides a control device which allows the fast transient recovery of DC-DC converters.

In architecture, the control device according to the invention comprises: (A) a control signal generating module; (B) a first current control module; (C) a second current control module; and (D) a magnetically-coupled inductive circuit module.

The control device according to the invention is characterized by using a dual-threshold method to compare the actually received loading voltage values on the loading terminals of DC-DC converters, i.e., a total of 4 threshold levels including a negative-ripple falling-edge threshold and a negative-ripple rising-edge threshold on the negative polarity of the DC output amplitude, and a positive-ripple rising-edge threshold and a positive-ripple falling-edge threshold on the positive polarity of the same, where the negative-ripple rising-edge threshold is higher in level than the negative-ripple falling-edge threshold, while the positive-ripple falling-edge threshold is lower than the positive-ripple rising-edge threshold.

During the transient, the control device disclosed in the invention may be switched between a charging and a discharging mode based on the relation between two-pairs threshold values and output voltage amplitude of DC-DC converters. This feature may discharge the transient output voltage, raised by the over-shoot, to the steady state by switching to the discharging mode, and similarly charge the transient output voltage, dropped by the under-shoot, to the steady state by switching to the charging mode. This mechanism may allow DC-DC converters with higher slew rate to make transient ripples of output voltage to return to steady state more quickly.

BRIEF DESCRIPTION OF DRAWINGS

The invention may be more fully understood by reading the following detailed description of the preferred embodiments, with reference made to the accompanying drawings, wherein.

DETAILED DESCRIPTION OF PREFERRED EMBODIMENTS

The control device for the fast transient recovery of DC-DC converters according to the invention is disclosed in full details by way of preferred embodiments in the following with reference to the accompanying drawings.

Figure 1:
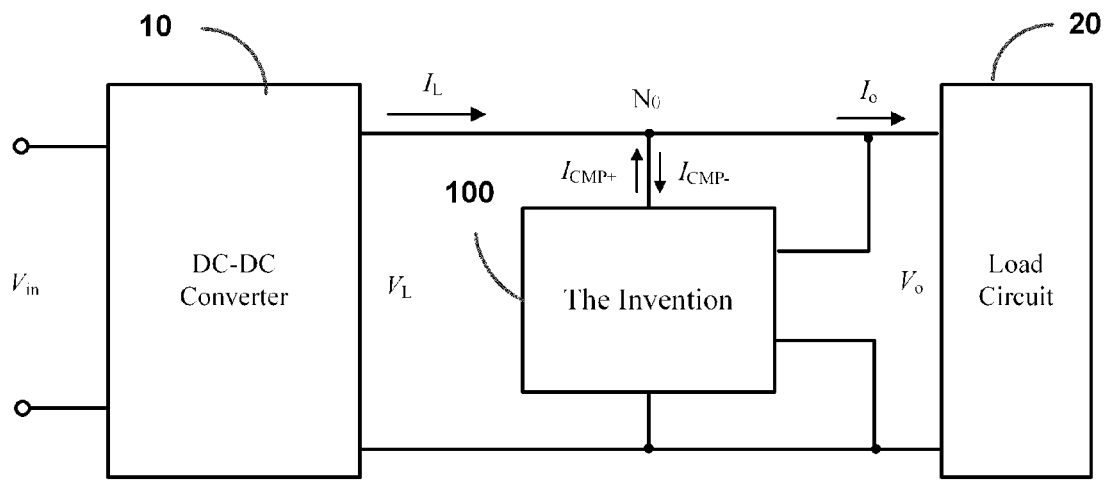
FIG. 1 is a schematic diagram showing an application example of the control device of the invention.

FIG. 1 is a schematic diagram showing an application example of the control device (herein the circuit module labeled 100) of the invention. As shown, the control device 100 is designed for a DC-DC converter 10. The DC-DC converter 10 is used for converting an input DC voltage $V_{in}$ in a DC-to-DC manner to generate an output of a DC load voltage $V_L$ and a DC load current $I_L$ for a load circuit 20 (the actual load voltage and current received by the load circuit 20 are denoted by $V_o$ and $I_o$ respectively).

Figure 2:
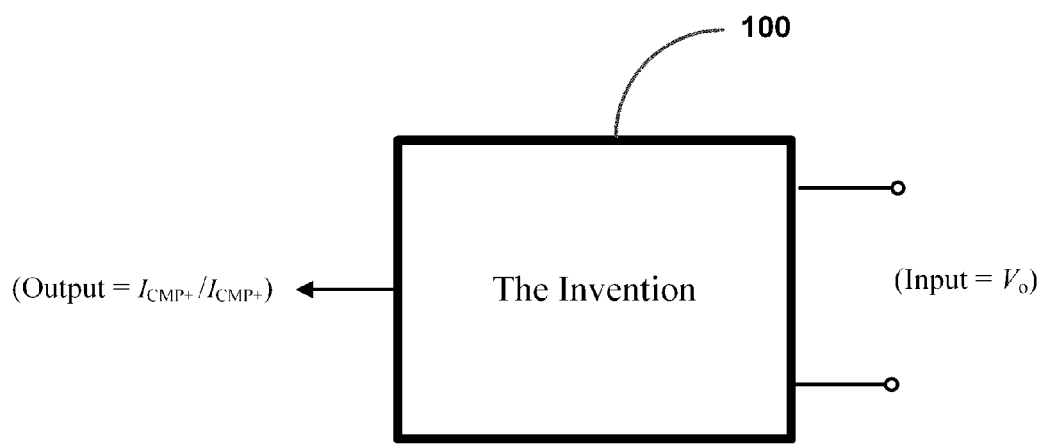
FIG. 2 is a schematic diagram showing the I/O functional model of the control device of the invention.

FIG. 2 is a schematic diagram showing the input/output (I/O) functional model of the control device 100 of the invention. As shown, the control device 100 of the invention is capable of performing a charging/discharging/OFF operation for the output load current $I_L$ of the DC-DC converter 10 in response to the actual load voltage $V_o$ received by the load circuit 20. More specifically, the control device 100 of the invention is capable of incessantly detecting the amplitude of $V_o$ for comparison in accordance with a dual-threshold comparison scheme (which is to be detailed below), thereby generating an output of a charging current (which is expressed as $I_{CPM+}$) or a discharging current (which is expressed as $I_{CPM-}$) and injecting the charging/discharging current ($I_{CPM+}$, $I_{CPM-}$) to the output node $N_o$ of the DC-DC converter 10 for mixing with the output load current $I_L$. This charging/discharging operation may allow the output load current $I_L$ to have fast transient recovery. Moreover, the control device 100 will be in an OFF operation if the control device 100 is in neither charging operation nor discharging operation. This OFF operation may allow the control device 100 to keep in low power consumption condition when the output voltage is close to the steady state value.

Figure 3:
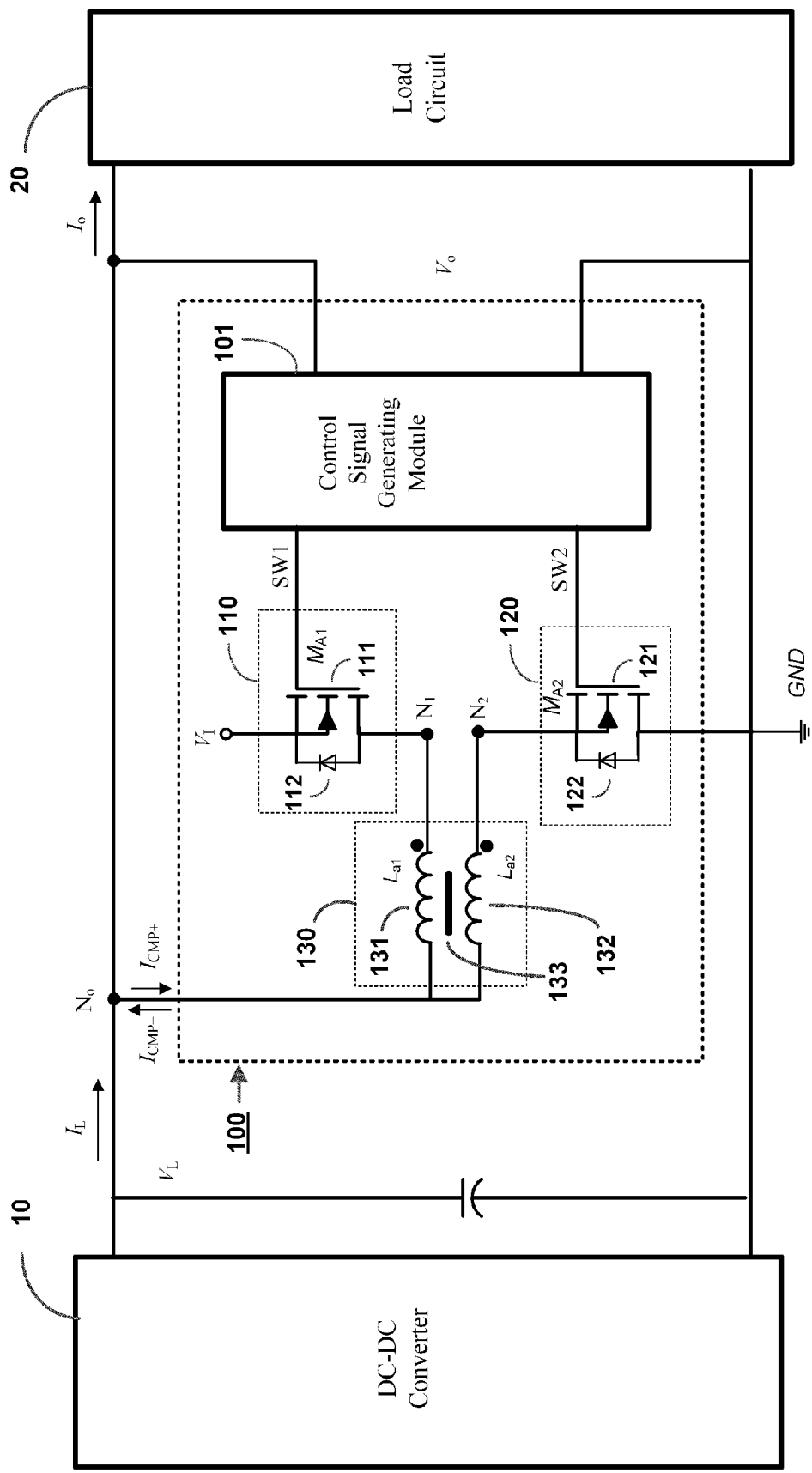
FIG. 3 is a schematic diagram showing the architecture of the control device of the invention.

As shown in FIG. 3, the control device 100 of the invention comprises: (A) a control signal generating module 101; (B) a first current control module 110; (C) a second current control module 120; and (D) a magnetically-coupled inductive circuit module 130.

The control signal generating module 101 is capable of detecting the amplitude of the actual load voltage $V_o$ received by the load circuit 20 and comparing the amplitude of $V_o$ in accordance with a dual-threshold comparison scheme against two sets of paired dual threshold levels on each polarity, i.e., a total of four threshold levels [($V_{th1-}$, $V_{th1+}$), ($V_{th2+}$, $V_{th2-}$)], including a negative-ripple falling-edge threshold ($V_{th1-}$) and a negative-ripple rising-edge threshold ($V_{th1+}$) on the negative polarity of $V_o$, and a positive-ripple rising-edge threshold ($V_{th2+}$) and a positive-ripple falling-edge threshold ($V_{th2-}$) on the positive polarity of $V_o$, to thereby generate a set of switching control signals (SW1, SW2).

Figure 6:
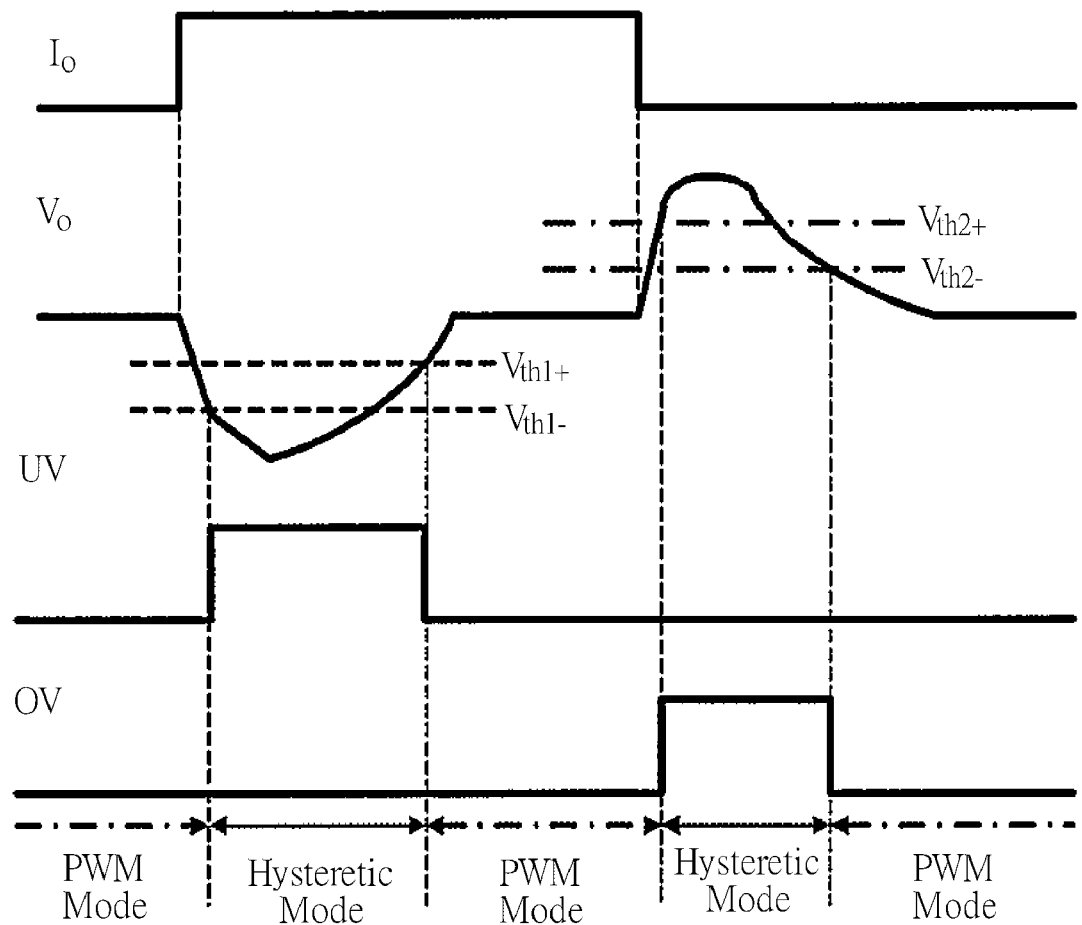
FIG. 6 is a simplified timing diagram showing the waveform switching control signals (SW1, SW2) with respect to the load voltage and current ($V_o$, $I_o$) in different operation modes.

FIG. 6 is a signal diagram showing the waveform and sequencing of the switching control signals (SW1, SW2) with respect to the load voltage and current ($V_o$, $I_o$) in reference to the comparison of the amplitude of $V_o$ against the 4 threshold levels [($V_{th1-}$, $V_{th1+}$), ($V_{th2+}$, $V_{th2-}$)]. As shown, the negative-ripple rising-edge threshold ($V_{th1+}$) is higher in level than the negative-ripple falling-edge threshold ($V_{th1-}$), while the positive-ripple falling-edge threshold ($V_{th2-}$) is lower than the positive-ripple rising-edge threshold ($V_{th2+}$)

As shown, in the event that $V_o$ exhibits any under-shoot, SW1 is switched to logic-HIGH state while SW2 is switched to logic-LOW state when the ripple amplitude reaches down below the negative-ripple falling-edge threshold ($V_{th1-}$). Subsequently, when $V_o$ bounces back from the negative extreme and reaches at $V_{th1-}$, SW1 still remains unchanged at logic-HIGH state and waits until $V_o$ further reaches up above the negative-ripple rising-edge threshold ($V_{th1+}$) to be switched back to logic-LOW state. During this period, SW2 constantly remains unchanged at logic-LOW state.

On the other hand, in the event that $V_o$ exhibits any over-shoot, SW2 is switched to logic-HIGH state while SW1 is switched to logic-LOW state when the ripple amplitude reaches up above the positive-ripple rising-edge threshold ($V_{th2+}$). Subsequently, when $V_o$ bounces back from the positive extreme and reaches at $V_{th2+}$, SW2 still remains unchanged at logic-HIGH state and waits until $V_o$ further reaches down below the positive-ripple falling-edge threshold ($V_{th2-}$) to be switched back to logic-LOW state. During this period, SW1 constantly remains unchanged at logic-LOW state.

The first current control module 110 is composed of a switching element 111 and a rectifying element 112; wherein the rectifying element 112 may be implemented with, for example, a semiconductor diode; while the switching element 111 may be implemented with, for example, an enhancement NMOS ($M_{A1}$) having a gate (control terminal), a source (first connecting terminal), and a drain (second connecting terminal). In circuit arrangement, the switching element ($M_{A1}$) 111 is interconnected in such a manner that its gate is connected for reception of the first switching control signal SW1 from the control signal generating module 101, its drain is connected to a drive voltage $V_I$, and its source is connected to a first node (N1); while the rectifying element 112 is connected across the drain and source of the switching element ($M_{A1}$) 111 for providing a unidirectional current flow path from the drain to the source.

In practice, for example, the switching element ($M_{A1}$) 111 and the rectifying element (diode) 112 may be either implemented by using two separate circuit elements (i.e., an NMOS transistor and a diode), or alternatively by using a single power MOSFET (Metal Oxide Semiconductor Field-Effect Transistor) device which has an inherent body diode such that one single power MOSFET device may be used to provide both the required switching function and the rectifying function. Moreover, the switching element ($M_{A1}$) 111 may be implemented with either an NMOS transistor or a PMOS transistor. In the case of implementation with a different MOS type, however, it is to be noted that the polarity of the switching control signals are correspondingly inversed. Among the above-mentioned two embodiments, since the first current control module 110 would be subjected to large-amplitude currents and high power consumption, the implementation with the power MOSFET device is more preferable.

In operation, when (SW1=LOW), it perform a switching-OFF operation on the switching element ($M_{A1}$) 111 of the first current control module 110 for disconnecting the source and drain into electrically-nonconductive state (OFF); whereas when (SW1=HIGH), it perform a switching-ON operation on the switching element ($M_{A1}$) 111 for connecting the source and drain into electrically-conductive state (ON) such that the drive voltage $V_I$ is electrically connected to the first node (N1).

Similar to the first current control module 110, the second current control module 120 is also composed of a switching element 121 and a rectifying element 122; wherein the rectifying element 122 may be implemented with, for example, a semiconductor diode; while the switching element 121 may be implemented with, for example, an enhancement NMOS ($M_{A2}$) having a gate (control terminal), a source (first connecting terminal), and a drain (second connecting terminal). In circuit arrangement, the switching element ($M_{A2}$) 121 is interconnected in such a manner that its gate is connected for reception of the second switching control signal SW2 from the control signal generating module 101, its source is connected to a second node (N2), and its drain is connected to a grounding point GND; while the rectifying element 122 is connected across the drain and source of the switching element ($M_{A2}$) 121 for providing a unidirectional current flow path from the grounding point GND to the second node (N2).

In practice, for example, the switching element ($M_{A2}$) 121 and the rectifying element (diode) 122 may be either implemented by using two separate circuit elements (i.e., an NMOS transistor and a diode), or alternatively by using a single power MOSFET (Metal Oxide Semiconductor Field-Effect Transistor) device which has an inherent body diode such that one single power MOSFET device may be used to provide both the switching function and the rectifying function. Moreover, the switching element ($M_{A2}$) 121 may be implemented with either an NMOS transistor or a PMOS transistor. In the case of implementation with a different MOS type, however, it is to be noted that the polarity of the switching control signals are correspondingly inversed. Among these two embodiments, since the current control module 120 would be subjected to large-amplitude currents and high power consumption, the implementation with the power MOSFET device is more preferable.

In operation, when (SW2=LOW), it perform a switching-OFF operation on the switching element ($M_{A2}$) 121 of the second current control module 120 for disconnecting its source and drain into electrically-nonconductive state (OFF); whereas when (SW2=HIGH), it perform a switching-ON operation on the switching element ($M_{A2}$) 121 for connecting its source and drain into an electrically-conductive state (ON) such that the second node (N2) is electrically connected to the grounding point GND.

The magnetically-coupled inductive circuit module 130 is composed of a first inductive element ($L_{a1}$) 131, a second inductive element ($L_{a2}$) 132, and a magnetic medium 133. In practice, for example, this magnetically-coupled inductive circuit module 130 may be implemented with either a coil transformer or an inductive integrated circuit (IC) architecture. If a large operating current or a large inductance is required, then it is preferable to use an off-chip architecture for the implementation.

In circuit arrangement, the first inductive element ($L_{a1}$) 131 has a first terminal connected to the first node (N1) and a second terminal connected to the output node $N_o$ of the DC-DC converter 10; while the second inductive element ($L_{a2}$) 132 has a first terminal connected to the second node (N2) and a second terminal connected to the output node $N_o$ of the DC-DC converter 10.

During operation, the control device 100 for transient recovery of DC-DC converters of the invention operates in three modes: (1) a charging operation mode; (2) a discharging operation mode; and (3) OFF operation mode, (1) and (2) are for fast transient recovery of the output DC power of the DC-DC converter 10. When the DC-DC converter is at steady state, the invention 100 won't be operating (OFF mode), and both $M_{A1}$ and $M_{A2}$ are cut off.

(1) Charging Operation Mode

Referring to FIG. 6, during the period when $I_o$ is step-up load situation, $V_o$ first exhibits a under-shoot in the initial stage and then returns to steady state in the next stage. In this case, the control device 100 of the invention will operate in the charging operation mode for pushing up the under-shoot, as described below.

When the output voltage under-shoot reaches down below the negative-ripple falling-edge threshold ($V_{th1-}$), i.e., ($V_o \leq V_{th1-}$), it will cause the control signal generating module 101 to output (SW1, SW2)=(HIGH, LOW), thus activating the switching element ($M_{A1}$) 111 in the first current control module 110 to be switched ON and meanwhile activating the switching element ($M_{A2}$) 121 in the second current control module 120 to be switched OFF.

Figure 4A:
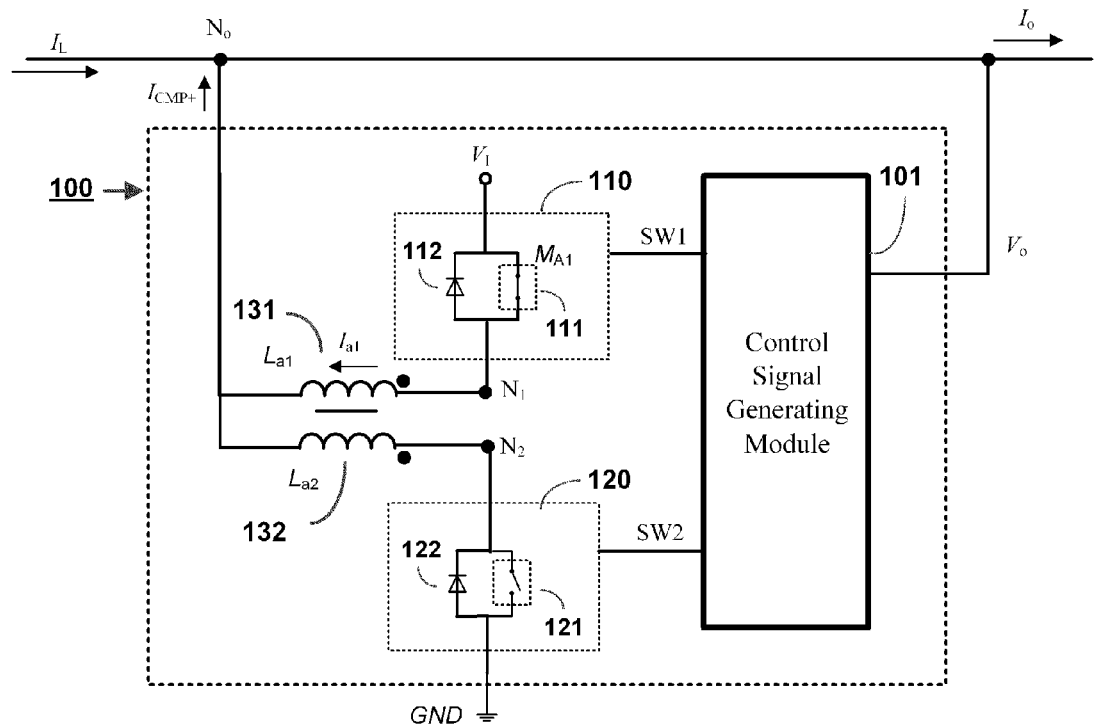
FIGS. 4A-4B are schematic diagrams showing the equivalent circuits of the control device of the invention during charging operation.

FIG. 4A shows the equivalent circuit of the control device 100 of the invention under the condition of ($M_{A1}$, $M_{A2}$)=(ON, OFF). As shown, this condition causes the drive voltage $V_I$ to be electrically connected to the first inductive element ($L_{a1}$) 131, thereby inducing an electrical current $I_{a1}$ to flow through the first inductive element ($L_{a1}$) 131. The induced current $I_{a1}$ serves as a charging current (expressed as $I_{CMP+}$) which is injected to the output node $N_o$ of the DC-DC converter 10. At the same time, since the switching element ($M_{A2}$) 121 is switched OFF, no current flows through the second inductive element ($L_{a2}$) 132.

Subsequently, when $V_o$ bounces back from the negative extreme and reaches at $V_{th1-}$, SW1 still remains unchanged at logic-HIGH state and waits until $V_o$ further reaches up above the negative-ripple rising-edge threshold ($V_{th1+}$) to be switched back to logic-LOW state. The condition of (SW1, SW2)=(LOW, LOW) causes ($M_{A1}$, $M_{A2}$)=(OFF, OFF).

Figure 4B:
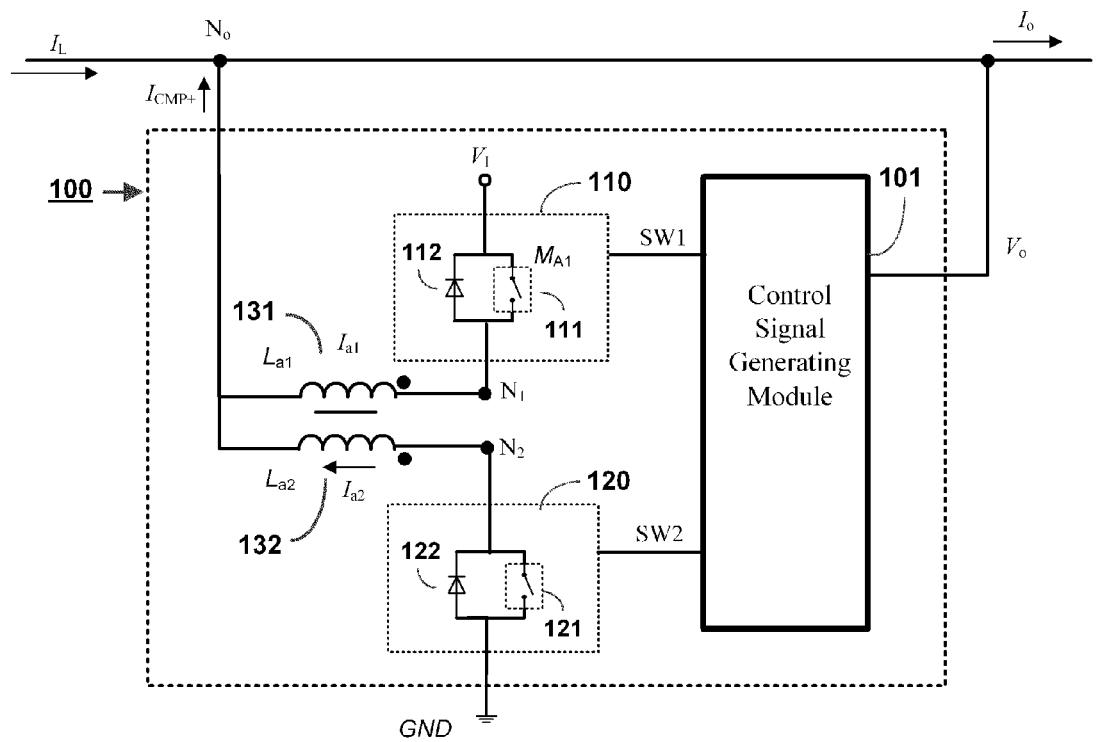

FIG. 4B shows the equivalent circuit of the control device 100 of the invention under the condition of ($M_{A1}$, $M_{A2}$)=(OFF, OFF). As shown, under this condition, $V_o$ will induce an electrical current $I_{a2}$ to flow through the rectifying element (diode) 122 in the second current control module 120 and subsequently flow through the second inductive element ($L_{a2}$) 132, which serves as a charging current $I_{CMP+}$ for injection into the output node $N_o$ of the DC-DC converter 10.

After the charging current $I_{CMP+}$ is injected into the output node $N_o$, it is added to the output load current $I_L$ of the DC-DC converter 10, thereby providing a driving force that may push up the under-shoot in $V_o$ to return more quickly to the steady-state value.

Theoretically, during the foregoing charging operation, when the switching element ($M_{A1}$) 111 in the first current control module 110 is switched ON, the charging current $I_{CMP+}$ changes with time as follows:

$$\frac{di_{CMP}}{dt} = \frac{di_{a1}}{dt} = \frac{V_I - V_o}{L_{a1}} \quad (A1)$$

On the other hand, when the switching element ($M_{A1}$) 111 is switched OFF, the charging current $I_{CMP+}$ changes with time as follows:

$$\frac{di_{CMP}}{dt} = \frac{di_{a2}}{dt} = \frac{-V_o - V_D}{L_{a2}} \quad (A2)$$

where $V_D$ is the forward voltage drop across the rectifying element (diode) 122 in the second current control module 120.

It may be learned from the above equation (A1) that the change of the charging current $I_{CMP+}$ with respect to time is inversely proportional to the inductance of the first inductive element ($L_{a1}$) 131. Therefore, in design, we may adjust the first inductive element ($L_{a1}$) 131 to a smaller inductance for increasing the rate of change of the charging current $I_{CMP+}$ with respect to time to thereby achieve faster transient recovery.

(2) Discharging Operation Mode

Referring also to FIG. 6, during the period when $I_o$ step-down load situation, $V_o$ first exhibits a over-shoot in the initial stage and then returns to steady state in the next stage. In this case, the control device 100 of the invention will operate in the discharging operation mode to push down the over-shoot, as described below.

When the ripple amplitude of $V_o$ reaches up above the positive-ripple rising-edge threshold ($V_{th2+}$), i.e., ($V_o \geq V_{th2+}$), it will cause the control signal generating module 101 to output (SW1, SW2)=(LOW, HIGH), thus activating the switching element ($M_{A1}$) 111 in the first current control module 110 to be switched OFF and meanwhile activating the switching element ($M_{A2}$) 121 in the second current control module 120 to be switched ON, i.e., ($M_{A1}$, $M_{A2}$)=(OFF, ON).

Figure 5A:
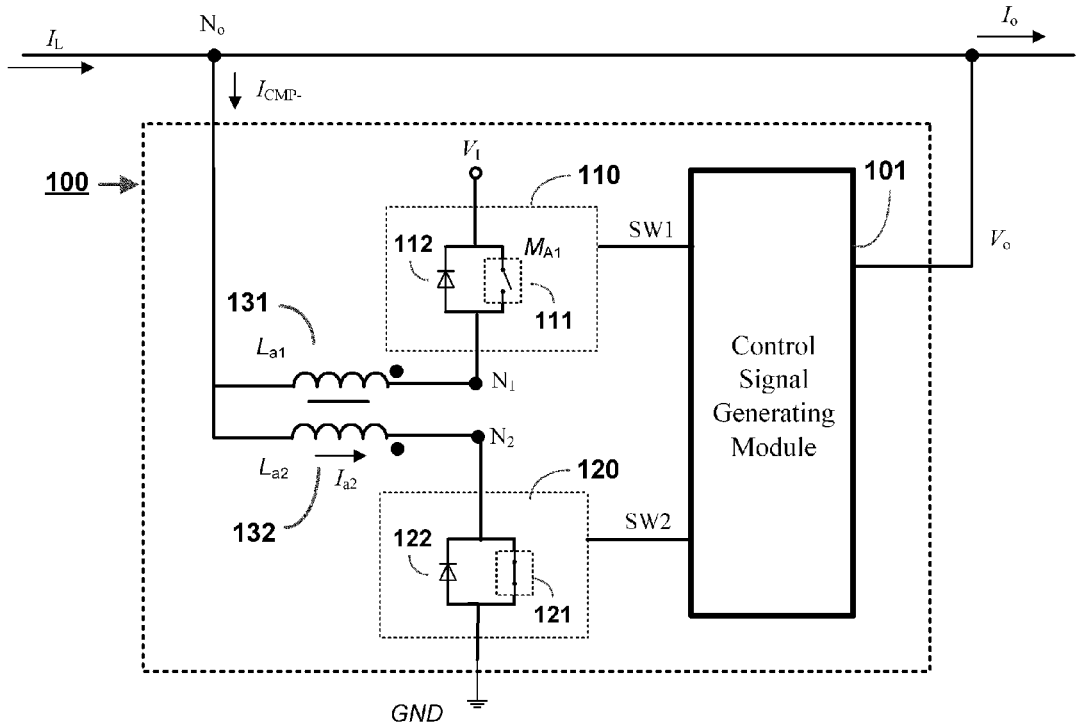
FIGS. 5A-5B are schematic diagrams showing the equivalent circuits of the control device of the invention during discharging operation.

FIG. 5A shows the equivalent circuit of the control device 100 of the invention under the condition of ($M_{A1}$, $M_{A2}$)=(OFF, ON). This condition causes the node $N_2$ to be electrically connected to the grounding point GND, thereby inducing an electrical current $I_{a2}$ to flow through the second inductive element ($L_{a2}$) 132 to serve as a discharging current (expressed as $I_{CMP-}$). At the same time, since the switching element ($M_{A1}$) 111 is switched OFF, no current flows through the first inductive element ($L_{a1}$) 131.

Subsequently, when $V_o$ bounces back from the positive extreme and reaches at $V_{th2+}$, SW2 still remains unchanged at logic-HIGH state and waits until $V_o$ further reaches down below the positive-ripple falling-edge threshold ($V_{th2-}$) to be switched back to logic-LOW state. The condition of (SW1, SW2)=(LOW, LOW) causes $(M_{A1}, M_{A2})$=(OFF, OFF).

Figure 5B:
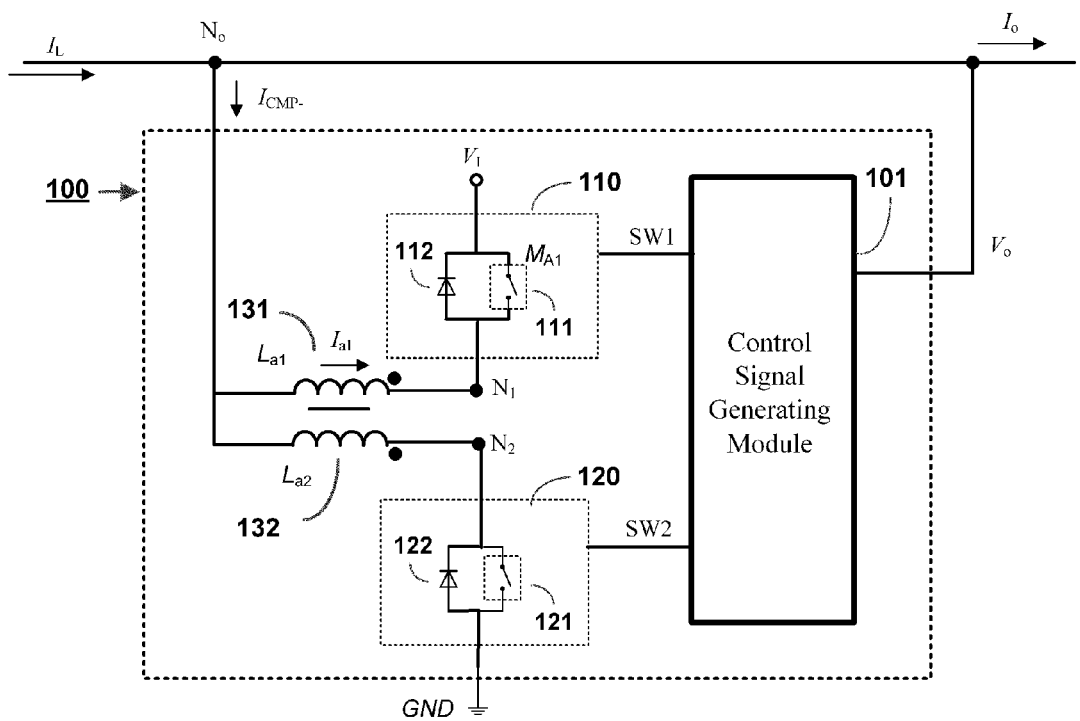

FIG. 5B shows the equivalent circuit of the control device 100 of the invention under the condition of $(M_{A1}, M_{A2})$=(OFF, OFF). As shown, under this condition, $V_o$ will induce an electrical current $I_{a1}$ to flow through the rectifying element (diode) 112 in the first current control module 110 and subsequently flow through the first inductive element $(L_{a1})$ 131, which then serves as a discharging current $I_{CMP-}$ for injection into the output node $N_o$ of the DC-DC converter 10.

After the discharging current $I_{CMP-}$ is drained off the output node $N_o$, it provides a subtraction effect to the output load current $I_L$, thereby pushing down the over-shoot in $V_o$ so that the amplitude of $V_o$ may return to steady state more quickly.

Theoretically, during the foregoing discharging operation, when the switching element $(M_{A2})$ 121 in the second current control module 120 is switched ON, the discharging current $I_{CMP-}$ changes with time as follows:

$$\frac{di_{CPM}}{dt} = \frac{di_{a2}}{dt} = \frac{V_o}{L_{a2}} \quad (B1)$$

On the other hand, when the switching element $(M_{A2})$ 121 is switched OFF, the discharging current $I_{CMP-}$ changes with time as follows:

$$\frac{di_{CPM}}{dt} = \frac{di_{a1}}{dt} = \frac{V_o - V_D - V_1}{L_{a1}} \quad (B2)$$

where $V_D$ is the forward voltage drop across the rectifying element (diode) 112 in the first current control module 110.

It may be learned from the above equation (B1) that the change of the discharging current $I_{CMP-}$ with respect to time is inversely proportional to the inductance of the second inductive element $(L_{a2})$ 132. Therefore, in design, we may adjust the second inductive element $(L_{a2})$ 132 to a smaller inductance for increasing the rate of change of the discharging current $I_{CMP-}$ with respect to time such that a faster transient recovery may be achieved.

In practice, the values of $L_{a1}$ and $L_{a2}$ are preferably chosen in such a manner as to allow the rate of change of the charging current $I_{CMP+}$ with respect to time to be exactly equal to that of the discharging current $I_{CMP-}$.

In conclusion, it may be learned from the forgoing description that the invention is capable of allowing the output voltage of the DC-DC converter to return to steady state more quickly when subjected to load current variation. This feature allows the DC-DC converter to have fast transient recovery.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A control device for integration between a direct-current (DC) power output unit and a load circuit, wherein the DC power output unit is capable of generating a DC output power for the load circuit, the control device comprising:

a control signal generating module that detects the output voltage amplitude of the DC power output unit for comparison in accordance with a dual-threshold comparison scheme against a pair of preset threshold levels on each polarity of the output power, including a negative-ripple falling-edge threshold and a negative-ripple rising-edge threshold on the negative polarity, and a positive-ripple rising-edge threshold and a positive-ripple falling-edge threshold on the positive polarity, to thereby generate a first switching control signal and a second switching control signal;

a first current control module having a first switching element and a first rectifying element, the first switching element responding to the first switching control signal by connecting a drive voltage to a first node, the first rectifying element connected between the drive voltage and the first node for providing a unidirectional current flow path therebetween;

a second current control module having a second switching element and a second rectifying element, the second switching element responding to the second switching control signal by connecting a second node to a grounding point, the second rectifying element connected between the second node and the grounding point for providing a unidirectional current flow path therebetween; and a magnetically-coupled inductive circuit module having a first inductive element and a second inductive element, the first inductive element connected between the first node and the output node, the second inductive element connected between the second node and the output node and is magnetically coupled to the first inductive element.

2. The control device of claim 1, wherein the first switching element in the first current control module is a PMOS transistor.

3. The control device of claim 1, wherein the first switching element in the first current control module is an NMOS transistor.

4. The control device of claim 1, wherein the first rectifying element in the first current control module is a semiconductor diode.

5. The control device of claim 1, wherein the second switching element in the second current control module is a PMOS transistor.

6. The control device of claim 1, wherein the second switching element in the second current control module is an NMOS transistor.

7. The control device of claim 1, wherein the second rectifying element in the second current control module is a semiconductor diode.

8. The control device of claim 1, wherein the first current control module is implemented with a power MOSFET (Metal Oxide Semiconductor Field-Effect Transistor) device having an inherent body diode.

9. The control device of claim 8, wherein the power MOSFET device is a PMOS type.

10. The control device of claim 8, wherein the power MOSFET device is an NMOS type.

11. The control device of claim 1, wherein the second current control module is implemented with a power MOSFET (Metal Oxide Semiconductor Field-Effect Transistor) device having an inherent body diode.

12. The control device of claim 1, wherein the magnetically-coupled inductive circuit module is implemented with a coil transformer.

13. The control device of claim 1, wherein the magnetically-coupled inductive circuit module is implemented with an inductive integrated circuit (IC) architecture.

14. A control device for integration between a direct-current (DC) power output unit and a load circuit, wherein the DC power output unit is capable of generating a DC output power for the load circuit, which comprises:

a control signal generating module that detects the output voltage amplitude of the DC power output unit for comparison in accordance with a dual-threshold comparison scheme against a pair of preset threshold levels on each polarity of the output power, including a negative-ripple falling-edge threshold and a negative-ripple rising-edge threshold on the negative polarity, and a positive-ripple rising-edge threshold and a positive-ripple falling-edge threshold on the positive polarity, to thereby generate a first switching control signal and a second switching control signal;

a first power MOSFET module that provides both a switching function and a rectifying function, the switching function responding to the first switching control signal by connecting a drive voltage to a first node, the rectifying function providing a unidirectional current flow path between the drive voltage and the first node;

a second power MOSFET module that provides both a switching function and a rectifying function, the switching function responding to the second switching control signal by connecting a second node to a grounding point, the rectifying function providing a unidirectional current flow path between the second node and the grounding point;

a magnetically-coupled inductive circuit module having a first inductive element and a second inductive element, the first inductive element connected between the first node and the output node, the second inductive element connected between the second node, the output node and magnetically coupled to the first inductive element.

15. The control device of claim 14, wherein the first power MOSFET module is an N-type of MOSFET device.

16. The control device of claim 14, wherein the first power MOSFET module is a P-type of MOSFET device.

17. The control device of claim 14, wherein the second power MOSFET module is an N-type of MOSFET device.

18. The control device of claim 14, wherein the second power MOSFET module is a P-type of MOSFET device.

19. The control device of claim 14, wherein the magnetically-coupled inductive circuit module is implemented with a coil transformer.

20. The control device of claim 14, wherein the magnetically-coupled inductive circuit module is implemented with an inductive integrated circuit (IC) architecture.

* * * * *